Nov. 22, 1960 E. B. WILFORD ET AL 2,961,051
ROTOR HUB AND DRIVE SYSTEM
Filed Nov. 17, 1955 3 Sheets-Sheet 2
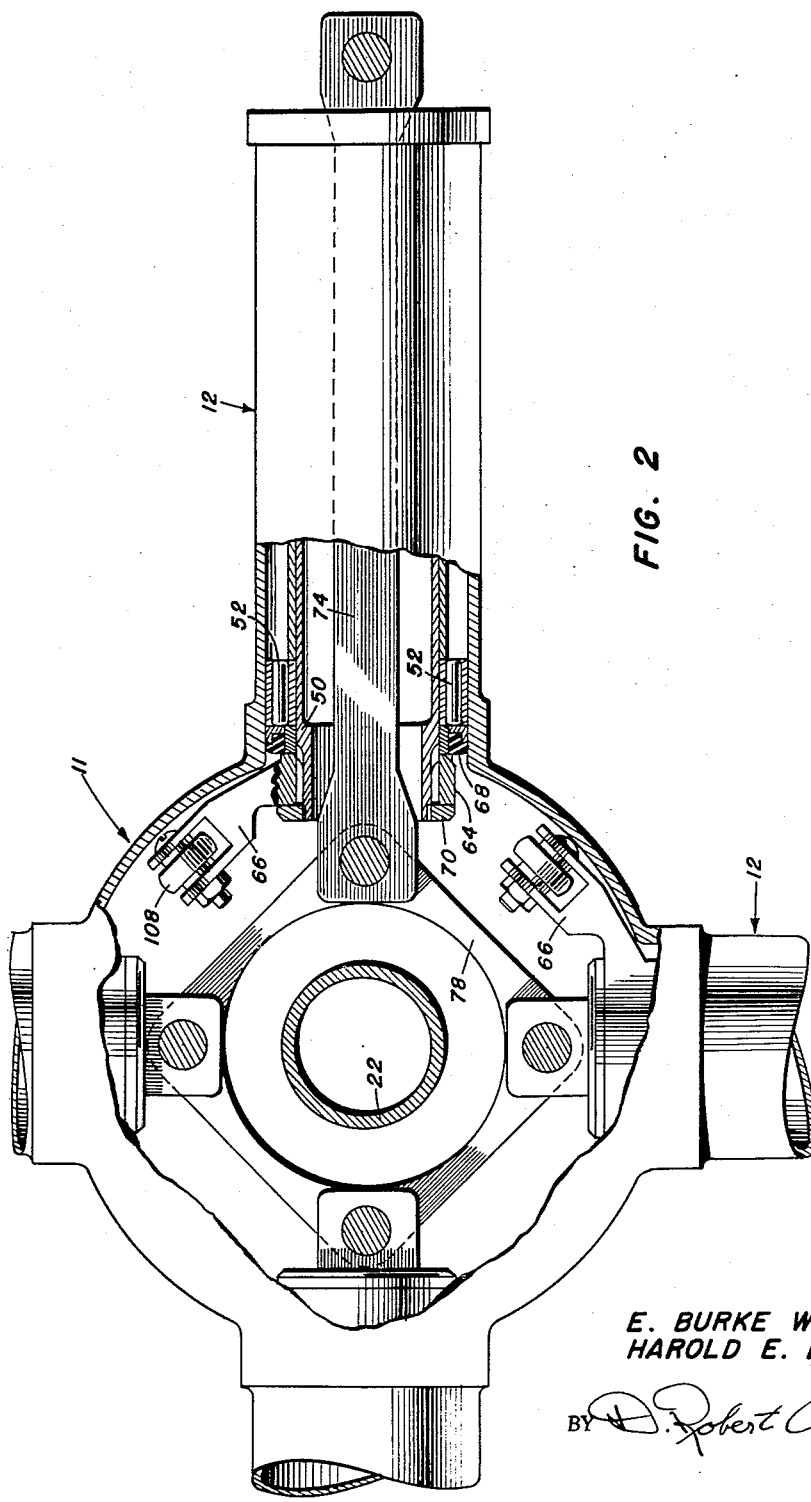
FIG. 2
INVENTORS
E. BURKE WILFORD
HAROLD E. LEMONT, Jr.
ATTORNEY Nov. 22, 1960   E. B. WILFORD ET AL   2,961,051
ROTOR HUB AND DRIVE SYSTEM
Filed Nov. 17, 1955   3 Sheets-Sheet 3

INVENTORS
E. BURKE WILFORD
HAROLD E. LEMONT, Jr.
BY Robert Cervera
ATTORNEY

United States Patent Office 2,961,051
Patented Nov. 22, 1960

2,961,051

ROTOR HUB AND DRIVE SYSTEM

Edward Burke Wilford, Merion Station, and Harold E. Lemont, Jr., Pottstown, Pa.

Filed Nov. 17, 1955, Ser. No. 547,366

14 Claims. (Cl. 170—135.7)

The present invention relates to a rotor system and more particularly to a rotor system having a universally mounted tilting hub wherein a self-centering device eliminates dynamic vibrations due to unbalanced forces and provides constant speed drive at a materially reduced production cost.

As an example of a prior art practice in constant speed rotor system types reference may be had to the United States patent to Glidden Doman, No. 2,648,387, in which a high speed internal drive shaft runs within a rotor shaft having a constant velocity joint located at the center of tilt of the rotor system. The reduction from engine to rotor speed occurs above the hub in a gear box situated above the rotor system. Generally, the rotor blades are hinged to the hub in both the horizontal and vertical plane, wherein difficulties arise in that the rotor blades get out of dynamic balance when coned or flapped excessively and necessitates the provision of a usually structurally complicated hinge and damper system. Also, the blades have a low period of vibration, with respect to their hinges, which is less than the r.p.m. of the rotor system and results in dynamic vibrations due to unbalanced forces.

In the rotor systems just referred to, the universal joint and gear box have to be very accurately manufactured which results in high production costs. Also, since the gear box is situated in the air stream, considerable drag is generated. The constant speed universal joints are usually small and delicate in construction and wear, requiring frequent expensive replacements. Further, the usual controls for simultaneous and cyclic pitch change are situated outside the hub structure resulting in greater drag loads. The methods utilized for tilting the hub or flapping the rotor blades are substantially complex in nature and incongruous with a simple and relatively inexpensive rotor system greatly desired in the aircraft industry.

Accordingly, it is an object of the present invention to provide a simple method of rotor blade attachment to a hub which can be unloaded on the fixed wing in flight and restored to symmetry with the aircraft when unloaded.

Another object is to provide a rotor system with a hub driven by a light-weight constant speed universal joint.

A further object of the invention is the provision of a rotor system for aircraft which will not be subject to the usual dynamic vibrations due to unbalanced forces or resonance in any condition of flight.

Another object is to provide a self-centering hub of the universally mounted tilting type which is greatly simplified and cheaper to construct.

A still further object of the invention is to provide a simple but positive method of pitch control of the rotor blade without sacrifice of structural strength.

Another object is to provide resilient stops for the tilting action of the hub so that the structure of the rotor system is not over loaded.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1a is a side view, partly in section, of the swashplate assembly;

Fig. 2 is a plan view, partly in section, of the hub showing the interlocking tension device for the rotor blades;

Figure 1:
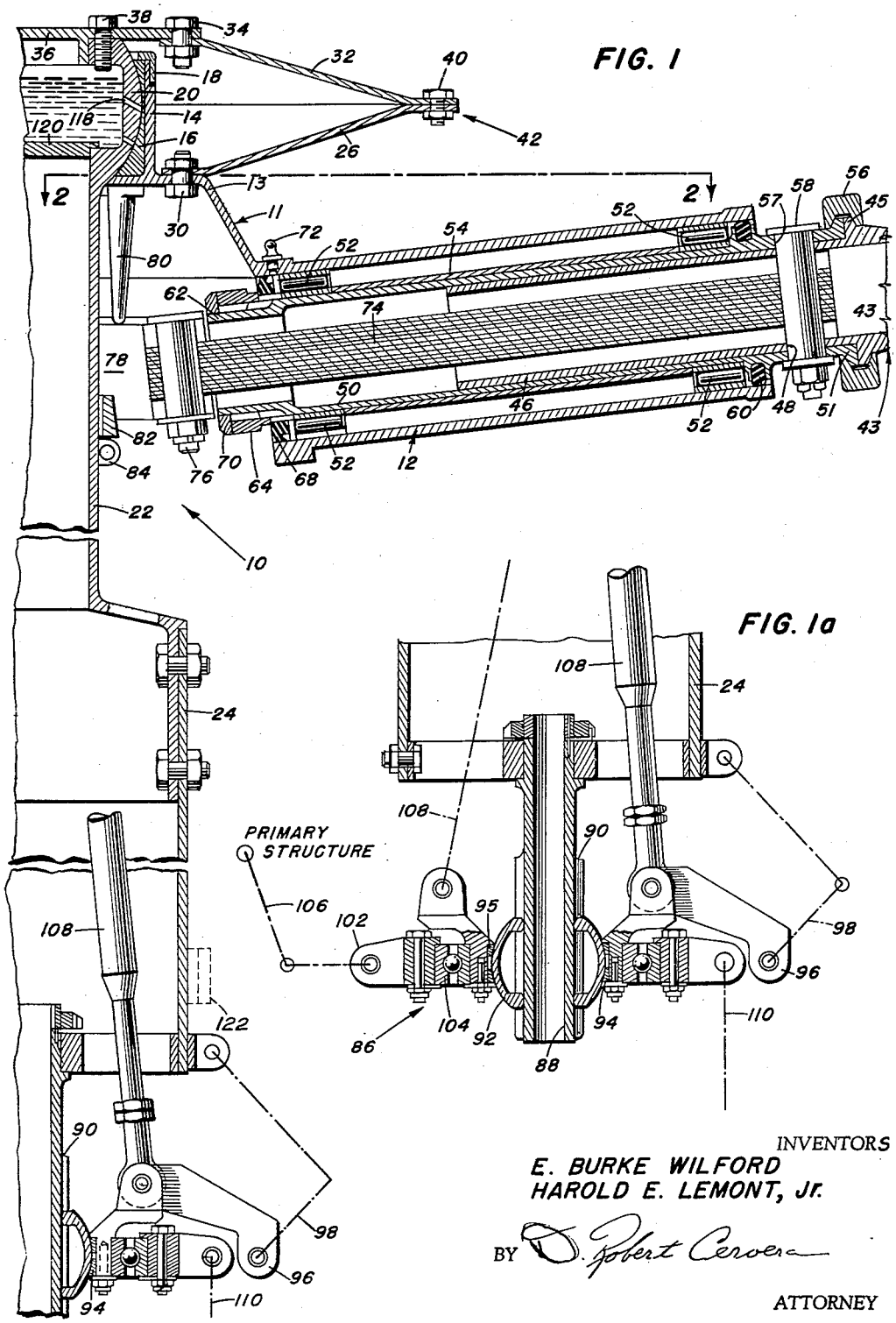
Fig. 1 is a side view, partly in section, of a preferred embodiment of the invention.

The apparatus, as shown, comprises a rotor system 10 having a hub 11 formed with a plurality of cylindrical hub arms 12, a concentric supporting shoulder 13 and bearing flange 14 integral therewith. A hub bearing 16 of suitable bearing material, such as bronze, or the like, is rigidly mounted within the flange 14 and secured therein by a bearing retainer 18 threadedly fixed upon said flange to facilitate maintenance of said hub bearing. The hub bearing 16 operatively coacts with a pivot ball 20 for universal motion relative thereto. The pivot ball 20 is integrally formed with the upper extension 22 of drive shaft 24, as hereinafter discussed.

A lower flexible spider 26 having a plurality of radial fingers 28 is concentrically secured to the supporting shoulder 13 of hub 11 by means of bolts 30, or other similar securing means. An upper flexible spider 32, structurally and functionally identical to the spider 26, is fastened through bolts 34, or the like to a circular plate 36 coaxially fixed to the drive shaft extension 22 through suitable securing means, such as bolts 38, for rotation therewith. The lower and upper flexible spiders are operatively connected together at the tips of their radial fingers 28 by means of bolts 40. Thus, a light-weight constant speed universal joint 42 capable of delivering high torque is provided to connect the hub 11 to the drive shaft extension 22. The joint 42 permits the hub to tilt in the desired direction whenever the spiders 26 and 32 are flexed in a manner hereinafter discussed. The action of the joint 42 is such that constant speed drive is achieved without rubbing, sliding, or utilization of rotating parts. Further, tilting action of the joint 42 creates an elastic couple which forces the return of the hub 11 to its normal position of equilibrium.

Accordingly, since the hub 11 is mounted on the pivot ball 20 integrally formed on the drive shaft extension 22, the pivot center of the rotor system 10 is located substantially at the plane of the centers of gravity of rotor blades 43 or the dynamic center, the point at which all the forces generated by the rotor system are acting upon the aircraft, of the rotor system. Thus, the dynamic couples, resulting from forces generated by the rotor blades in their azimuthal path primarily due to the varying aerodynamic forces, which tend to unbalance the rotor system 10 are materially reduced.

The rotor blades 43 are each formed with a blade shank, having an integral circumferential flange 45, and with a blade shank extension 46 provided with diametrically opposed apertures 48. A rotatable spindle 50 formed with a circumferential flange 51, is journalled within each of the hub arms 12 by means of roller bearings 52 which are radially spaced from each other by a cylindrical bearing spacer 54. The blade shank extension 46 snugly fits within the spindle 50 so that circumferential flanges 45 and 51 are juxtaposed and fixedly secured together by a blade clamp 56. The spindle 50 is provided with diametrically opposed apertures 57 coinciding with apertures 48 for insertion therethrough of a tapered blade pin 58 for a use hereinafter discussed. A resilient O-ring 60, fixed to the spindle 50, is coaxially positioned between said blade spindle and the hub arm 12 so as to seal the end thereof from deleterious matter.

The end 62 of spindle 50 extending within the hub 11, is externally splined to receive thereon an internally splined pitch control collar 64 formed with an integral pitch control lever 66 which, in the preferred embodiment, is provided with an inbuilt adjustable lead normally set at 45 degrees to allow for the well known "aerodynamic control lag." The control collar 64 is firmly positioned against a seal 68, abutting roller bearings 52, by a retainer nut 70 threadedly mounted on the spindle end 62. A conventional lubricating fitting 72 is utilized for periodic servicing of the roller bearings 52.

The tapered blade pin 58 serves as an outboard anchoring point for a plurality of parallel stainless steel tension straps 74 which are fixed at their inboard end by a tapered tension pin 76, to one corner of a tension square 78 which is coaxially spaced about the drive shaft extension 22 and positioned within the hub 11. Thus, the attachment of the blades 43 to the hub 11 is achieved by the utilization of tension torsion straps 74, which may be also constructed of wires, bars, or the like, carrying the high centrifugal forces developed by each blade in operation to the tension square 78 or directly to the hub 11 by having the torsion straps secured thereto at their inner ends. Consequently, these high centrifugal forces are transmitted through solid structure and react against each other without being carried into the hub 11 or the bearings 52 journaling the blades in the hub.

An upward stop 80 is provided secured at every 90 degrees of the azimuth to the undersurface of the hub shoulder 13 to position the tension square 78 when the blades are preconed. Also, the self-centering effect of the constant speed universal joint 42 is augmented by a resilient stop 82, of rubber or the like, which surrounds the drive shaft extension 22 and is fixedly secured thereto by a circular clamp 84 to thereby offer elastic restraint to the hub tilt when contacted by said tension square.

The resilient stop 82 is an important restraining factor while the aircraft is in flight and in cases of high winds when the aircraft is parked on the ground or on the deck of a vessel at sea. Consequently, the rotor does not have to be tied down, as is the custom at present, in order to prevent blade damage, and only conventional braking of the drive shaft 24 is necessary to prevent the rotors from rotating. The stop 82, in the preferred embodiment 10, has substantially a 3 degree resiliency upon contact by the tension square 78 which in turn has approximately a plus or minus 7 degrees free play before contacting said stop.

Pitch change for the blades is provided by the actuation of a swashplate assembly 86 operatively mounted on the lower drive shaft extension 88, which is keyed in a conventional manner to the main drive shaft 24 to rotate therewith. The shaft extension 88 is formed with a plurality of integral splines 90 which slidably coact with a control pivot ball 92 for common rotation therewith. A rotating control ring 94 is mounted, through bearing 95, for universal action upon the pivot ball 92 and is pivotally coupled through a drive scissors bracket 96 and torque scissors 98 to the main drive shaft 24 for rotation therewith. A stationary control ring 102 is concentrically mounted with respect to the rotating control ring 94 and radially spaced therefrom by ball bearings 104. A stationary scissor 106 pivotally couples the stationary control ring 102 to a primary structure, such as the airframe of the aircraft, to prevent rotation thereof.

Pitch control links 108 are pivotally coupled to the rotating control ring 94 to extend through the main drive shaft 24 and up to the inside of the hub 11 to pivotally connect with each of the pitch control levers 66, as shown in Fig. 2, for coaction therewith to rotate the spindle 50 and, accordingly, change the pitch setting of the blades 43 as desired. The distance of the swashplate assembly from the pitch control lever 66 and pitch control collar 64 is determined by the actuation of pitch control rods 110 pivotally connected to the stationary control ring 102 and to conventional cockpit controls, not shown. The swashplate 86 is tilted relative to the drive shaft by suitable actuation of the control rods 110 by the manipulation of the above mentioned cockpit controls.

An alternate method of construction for the swashplate assembly 86 and the related pitch control linkage is an external swashplate assembly connected to pitch control levers 66 which may be located outside the hub 11, for both mechanically or non-mechanically driven rotors.

Figure 4:
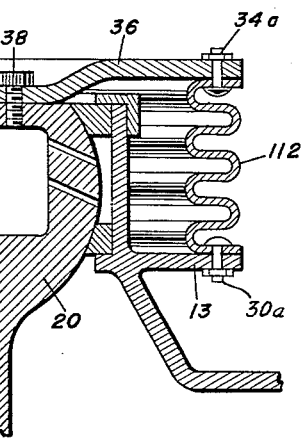
Fig. 4 is a sectional side view of a portion of the hub showing a modification of the securing structure between the hub and driving shaft.
Figure 5:
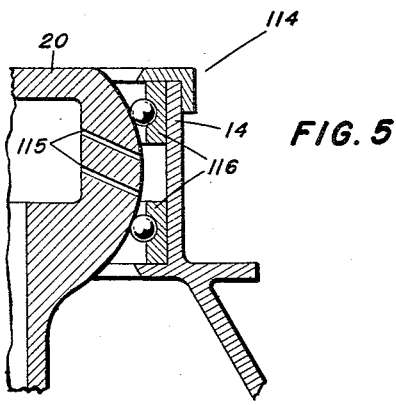
Fig. 5 is a sectional side view of a portion of the hub showing a modification of the bearing structure between the hub and driving shaft.

An alternate structure for the lower and upper flexible spiders 26 and 32, respectively, is shown in Fig. 4, wherein the flexible spiders are replaced by a cylindrically shaped metallic bellows 112 having resiliency characteristics substantially similar to the spider structure 42. The bellows is fixed to the upper plate 36 and to hub shoulder 13 by any suitable securing means, such as bolts 34a and 30a, respectively. Fig. 5 shows an alternate bearing structure 114 for the bearing 16, which consists of a plurality of ball bearings 116 between the flange 114 and the hub 11 and the pivot ball 20. This simple bearing structure can be utilized since the bearing loading is not critical in view of the fact that the hub 11 only transmits the rotor's lift loads to the pivot ball 20. Further, the pivot ball, integrally formed on the drive shaft extension 22, can be of a simple construction economical to produce for the same above-mentioned reasons. The interior of the pivot ball 20 serves as a lubricate reservoir for the bearings 16 or 116 through a number of outlets 118 while a shield 120 maintains the lubricate level therein. A gear 122 is shown secured to the main drive shaft 24 to indicate the attachment of a power driven transmission unit not shown, to the rotor system 10.

In operation, the rotor system 10 is driven through the gear 122 by a suitable power plant. The pitch control of the rotor blades 43 is obtained by the actuation of the swashplate assembly 86 through the movement of a standard aircraft control column plus the movement of the pitch control in the cockpit which can be actuated to increase and decrease with the throttle of the power plant. The collective pitch control of the rotor is achieved by the movement of the swashplate along the axis of the lower extension 88 of the main drive shaft in the conventional mechanical manner. The cyclic pitch control is achieved by tilting the swashplate assembly 86 through actuation of the pitch control rod 110 whereupon the direction of the lift vector of the whole rotor system 10 is accordingly changed.

The tilting action of the rotor hub 11 about the pivot ball 20 is caused by pitch changes in the blades 43 produced by the above mentioned tilting of the swashplate and the external aerodynamic and dynamic forces imposed upon each blade by the difference in speed of the blades in forward flight during rotation thereof. The hub tilt is limited by the dampening effect of the coacting flexible spiders 26 and 32, and the resilient stop 82, to thereby cause the blades and the whole rotor system 10 to return to a neutral position when the rotor system is unloaded, such as in the case of a flight as a convertiplane or when parked in a wind. Also, by suitable selection of the resiliency characteristics of the flexible spiders, increased or decreased stability of the whole aircraft can be achieved. Further, since the pivoting axis and the dynamic center of gravity of the rotor system 10 coincide, the coriolus forces in the plane of tilt are minimized so as to appreciatively reduce the blade and hub stresses and vibration.

Figure 3:
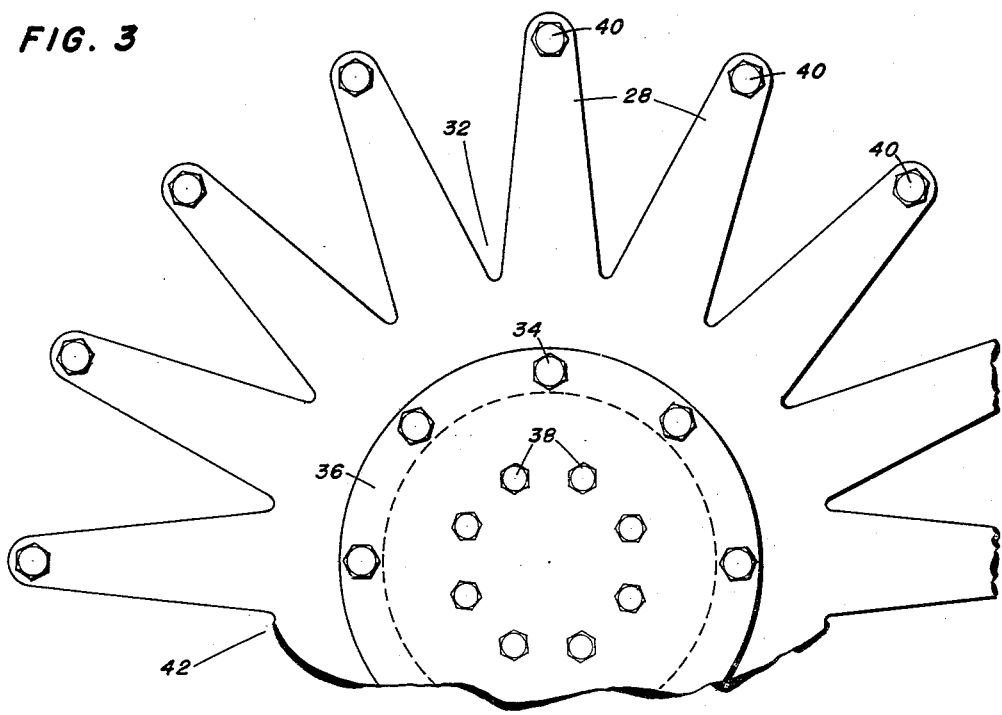
Fig. 3 is a plan view of a section of the flexible spider securing the rotor hub to the drive shaft.

The present invention, as exemplified by the preferred embodiment of Figs. 1 through 3, discloses a rotor system having a tilting rotor hub with rotor blades journalled therein and connected by a flexible tension system which tilts under controlling means including resilient stops to limit the tilting action. Consequently, a rotor system is disclosed which is characterized by a simplicity and ruggedness of design and a lower cost of production relative to existing rotor systems, and whereby a long-lasting universal joint drive for the rotor system is provided for the transmission of high torque. Further, the present invention provides for a coriolus free installation since the system is characterized by rotor blades of high stiffness mounted in a tilting hub and connected together with a tension torsion structure which can be made light and, therefore, easily balanced.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. In a rotary wing aircraft, a main rotor drive shaft having an upper and lower shaft extension, a pivot ball integral with the upper shaft extension, a hub universally journalled upon said pivot ball, a constant speed universal joint having a flexible member secured to the hub and to the end of the upper shaft extension so as to elastically restrain tilting of the hub, a plurality of cylindrical hub arms integral with the hub, each of said hub arms having a cylindrical spindle journalled therein, a plurality of rotor blades each having a blade shank fitting within the spindle and fixedly secured thereto, a tension square coaxially located relative to the upper shaft extension and coupled to the blade shank of each rotor blade to thereby relieve the hub of centrifugal force developed by the rotor blades in operation, resilient stops fixed about the periphery of the upper shaft extension to restrain tilting of the hub by limiting the motion of the tension square to a predetermined amount, a swashplate assembly slidably mounted on the lower shaft extension and internally coupled to each cylindrical spindle to rotate the blade for changing the pitch thereof.

2. A rotor system having a drive shaft, a pivot ball at one end of said drive shaft, a hub journalled on said pivot ball for universal motion relative thereto, a first flexible spider fixed to the hub, a second flexible spider fixed to the end of the drive shaft adjacent said pivot ball and to said first flexible spider to thereby provide the hub with a self-centering device, a plurality of rotor blades rotatably journalled in said hub, tension relieving means positioned coaxially with said drive shaft and secured to each of said rotor blades to prevent the transmission of spanwise blade leading to said hub, elastic means secured to said drive shaft and coacting with said tension relieving means to limit the tilt of said hub, a plurality of rigid means fixed to the interior of said hub and coaxial therewith to position said tension relieving means, and control means coupled to said rotor blades within said hub for changing the pitch of the same.

3. In a rotor system, a drive shaft having an integral pivot ball and resilient coupling means directly fixed thereto, a hub connected to said drive shaft through said resilient coupling means, a plurality of cylindrical hub arms integrally formed on said hub, a plurality of rotor blades each rotatably supported within one of said hub arms, means coupled to each rotor blade to relieve said hub of spanwise loading, a vertical flange coaxially provided on said hub, bearing means operatively supported between said vertical flange and said pivot ball so as to universally mount said hub on said drive shaft.

4. A rotor hub adapted to be driven by a rotor shaft comprising, a plurality of radially extending cylindrical hub arms, a vertical bearing flange, a supporting shoulder between said hub arms and bearing flange, bearing means rigidly mounted within said flange for universally mounting the hub on the rotor shaft, a lower flexible spider secured to said supporting shoulder and having a plurality of lower radial fingers, an upper flexible spider secured to the rotor shaft and having a plurality of upper radial fingers fastened at their extremities to the extremities of said lower radial fingers to thereby provide a self-centering coupling between the hub and rotor shaft, a plurality of blades each having a cylindrical spindle axially connected thereto, said spindle being rotatably mounted within a hub arm and having a spindle end portion extending within the interior of the hub, a pitch control collar secured to said spindle end portion and having an integral pitch control lever with an adjustable lead, a tension square positioned within the hub coaxially with the rotor shaft, tension straps connecting each blade and spindle to said tension square so as to relieve the hub of spanwise blade forces, and blade pitch control means coupled to said pitch control lever.

5. A hub in accordance with claim 4, but further characterized by a plurality of upward stops secured to the under surface of said supporting shoulder to thereby position said tension square.

6. A hub in accordance with claim 4, but further characterized by a resilient stop coaxially mounted on the rotor shaft to thereby elastically restrain tilting of the hub by contacting said tension square.

7. A rotor system having a drive shaft and a universally tilting rotor hub mounted thereon, a plurality of rotor blades journalled in said rotor hub, first and second operatively coupled flexible spiders, said first spider connected to said hub and said second spider connected to said drive shaft for predetermined tilting of said hub relative to said shaft, a flexible tension system coupling said rotor blades together, and resilient means contacting said tension system to limit the tilting of said rotor hub.

8. A rotor system comprising a self-centering hub having a plurality of flexible torque transmitting members operatively coupled together, a drive shaft having a bearing ball at one end thereof for universally mounting said self-centering hub thereon, one of said torque transmitting members connected to said drive shaft to transmit torque therefrom and to elastically restrain the tilting of said hub relative thereto, a plurality of rotor blades operatively associated with said hub for rotation therewith, blade relieving means positioned within said hub and coupled to each of said plurality of rotor blades to eliminate absorption of span-wise blade loading by said hub, and pitch control means coupled to each of said rotor blades for predeterminedly rotating the same within said hub.

9. In a rotor system, a drive shaft having integral universal mounting means at one end thereof, a hub operatively coupled to said mounting means, a unitary flexible means having one part thereof fixed to said drive shaft and a second part fixed to said hub for transmitting high torque thereto, said hub having a plurality of rotor blades rotatably mounted thereon, means coupling each of said rotor blades to each other to eliminate transmission of span-wise blade loadings to the drive shaft, said hub coupled through said flexible means to the drive shaft for predetermined tilting relative to the unloaded position of said blades in response to manual and aerodynamic actuations of said blades within said hub, and controlling means operatively connected to said blades for controlling the adjustment of said blades in response to said manual and aerodynamic actuations.

10. A rotor system having a drive shaft, a hub universally mounted on said drive shaft, self-centering means having a plurality of flexible means interconnecting said shaft and hub, a plurality of rotor blades operatively coupled to said hub for rotation therewith, resilient means coupled to said drive shaft and selectively associated with said hub to augment the self-centering action of said hub by elastically restraining the tilt of said hub to predetermined amounts, and load absorbing means coupling said blades and said hub for uniform distribution of span-wise loading therebetween.

11. A rotor system comprising a hub having a plurality of flexible means operatively coupled thereto, a drive shaft having universal mounting means integral therewith, one of said flexible means fixed to said drive shaft to limit tilting movement of said hub about said universal means, a plurality of blades adjustably connected to said hub and coupled together to eliminate the transmission of span-wise blade loading to said drive shaft.

12. A rotor system having a drive shaft and a universally tilting hub mounted thereon, a flexible self-centering device connecting said hub and said drive shaft for the transmission of torque therebetween, said flexible self-centering device having one part thereof fixed to said drive shaft to elastically restrain the movement of said hub within predetermined limits, rotor blades adjustably mounted on said hub so that control thereof determines the amount of the tilt in said hub, and means operatively coupling said rotor blades to eliminate the transmission of span-wise blade loading to said drive shaft.

13. In a rotary wing aircraft, a shaft having an integral universal joint at one end thereof, first flexible means fixed to said shaft adjacent said universal joint, second flexible means operatively coupled to said first flexible means for restrained universal movement relative to said shaft, a hub having a plurality of blades operatively connected thereto and mounted on said universal joint, and said hub structurally connected to said second flexible means for tilting movement relative to the unloaded position of said blades.

14. In a rotor system, a shaft having a universal joint integral therewith, a hub mounted on said universal joint for limited movement relative thereto, a plurality of blades mounted on said hub for adjustment about their span-wise axis, a flexible means connecting said hub and said joint to restrain the tilting action of said hub relative to the axis of said shaft, and control means coupled to each of said blades for predetermined control of said blades.

References Cited in the file of this patent

UNITED STATES PATENTS

| | | |
|---|---|---|
| 2,067,633 | Hafner | Jan. 12, 1937 |
| 2,648,387 | Doman | Aug. 11, 1953 |